(12) United States Patent
Lei et al.

(10) Patent No.: US 12,452,023 B2
(45) Date of Patent: Oct. 21, 2025

(54) METHOD AND APPARATUS FOR TRANSMITTING HARQ-ACK FEEDBACK FOR SIDELINK COMMUNICATION

(71) Applicant: Lenovo (Beijing) Ltd., Beijing (CN)

(72) Inventors: Haipeng Lei, Haidian District (CN); Xiaodong Yu, Haidian District (CN); Zhennian Sun, Chaoyang District (CN); Haiming Wang, Xicheng District (CN)

(73) Assignee: Lenovo (Beijing) Ltd., Beijing (CN)

( * ) Notice: Subject to any disclaimer, the term of this patent is extended or adjusted under 35 U.S.C. 154(b) by 259 days.

(21) Appl. No.: 17/913,323

(22) PCT Filed: Mar. 27, 2020

(86) PCT No.: PCT/CN2020/081711
§ 371 (c)(1),
(2) Date: Sep. 21, 2022

(87) PCT Pub. No.: WO2021/189428
PCT Pub. Date: Sep. 30, 2021

(65) Prior Publication Data
US 2023/0136864 A1      May 4, 2023

(51) Int. Cl.
*H04L 5/00* (2006.01)
*H04L 1/1829* (2023.01)
*H04W 72/25* (2023.01)

(52) U.S. Cl.
CPC .......... *H04L 5/0055* (2013.01); *H04L 1/1854* (2013.01); *H04W 72/25* (2023.01)

(58) Field of Classification Search
CPC ..... H04L 5/0055; H04L 1/1854; H04W 72/25
See application file for complete search history.

(56) References Cited

U.S. PATENT DOCUMENTS

| 2017/0215183 A1 | 7/2017 | Gulati et al. |
| 2017/0289733 A1 | 10/2017 | Rajagopal et al. |

(Continued)

FOREIGN PATENT DOCUMENTS

| CN | 103959699 A | 7/2014 |
| CN | 110445586 A | 11/2019 |

(Continued)

OTHER PUBLICATIONS 20926672.5, "Extended European Search Report", EP Application No. 20926672.5, Nov. 20, 2023, 13 pages.

(Continued)

*Primary Examiner* — Michael Thier
*Assistant Examiner* — Tracy Lauren Raimondo
(74) *Attorney, Agent, or Firm* — FIG. 1 Patents

(57) ABSTRACT

The present disclosure is related to methods and apparatuses. According to some embodiments of the disclosure, a method performed by a first UE for wireless communication includes: receiving, from a second UE, sidelink control information (SCI) on a first interlace on a carrier, wherein the SCI schedules data transmission on the carrier, and the first interlace comprises evenly-spaced resource blocks (RBs) in frequency domain; and transmitting, from the first UE, corresponding to the data transmission, a hybrid automatic repeat request acknowledgement (HARQ-ACK) feedback on a first feedback resource based on the SCI.

20 Claims, 8 Drawing Sheets

(56) References Cited

U.S. PATENT DOCUMENTS

| | | | |
|---|---|---|---|
| 2018/0324882 A1 | 11/2018 | Gulati et al. | |
| 2018/0368090 A1 | 12/2018 | Kadambar et al. | |
| 2019/0342874 A1 | 11/2019 | Davydov et al. | |
| 2020/0351033 A1* | 11/2020 | Ryu | H04L 1/1861 |
| 2021/0091901 A1* | 3/2021 | Sun | H04L 5/0094 |
| 2021/0092783 A1 | 3/2021 | Sun et al. | |
| 2021/0250131 A1* | 8/2021 | Fan | H04L 5/0055 |

FOREIGN PATENT DOCUMENTS

| | | | |
|---|---|---|---|
| CN | 110870365 | A | 3/2020 |
| CN | 114365570 | A | 4/2022 |
| CN | 114424640 | A | 4/2022 |
| WO | 2019196690 | A1 | 10/2019 |
| WO | 2021055648 | A1 | 3/2021 |

OTHER PUBLICATIONS

LG Electronics, "5G V2X with NR sidelink", 3GPP TSG RAN meeting #86, RP-192744, Sitges, Spain [retrieved Jan. 22, 2024]. Retrieved from the Internet <https://www.3gpp.org/ftp/tsg_ran/TSG_RAN/TSGR_86/Docs>, Dec. 2019, 53 pages.

PCT/CN2020/081711, "International Preliminary Report on Patentability", PCT Application No. PCT/CN2020/081711, Oct. 6, 2022, 5 pages.

PCT/CN2020/081711, "International Search Report and Written Opinion", PCT Application No. PCT/CN2020/081711, Dec. 30, 2020, 6 pages.

ZTE, "NR sidelink physical layer structure", 3GPP TSG RAN WG1 #99, R1-1912514, Reno, USA [retrieved Oct. 25, 2022]. Retrieved from the Internet <https://www.3gpp.org/ftp/tsg_ran/wg1_rl1/TSGR1_99/Docs/>., Nov. 2019, 12 Pages.

"Foreign Office Action", CN Application No. 202080099186.4, Feb. 17, 2025, 23 pages.

"Study on NR-based Access to Unlicensed Spectrum (Release 16)", 3GPP; Technical Specification Group Radio Access Network; 3GPP TR 38.889 V1.1.0 (Dec. 2018)., 119 pages, Dec. 2018.

"Foreign Office Action", EP Application No. 20926672.5, Mar. 4, 2025, 6 pages.

"Foreign Office Action", KR Application No. 10-2022-7033568, Jun. 10, 2025, 11 pages.

Ericsson, "PHY layer structure for NR sidelink", 3GPP TSG-RAN WG1 Meeting #99, R1-1912597, [Retrieved from the Internet], <https://www.3gpp.org/ftp/tsg_ran/WG1_RL1/TSGR1_99/Docs>, Nov. 8, 2019, 36 pages.

* cited by examiner

METHOD AND APPARATUS FOR TRANSMITTING HARQ-ACK FEEDBACK FOR SIDELINK COMMUNICATION

TECHNICAL FIELD

The present disclosure generally relates to wireless communication technology, and more particularly to hybrid automatic repeat request acknowledgement (HARQ-ACK) feedback transmission for sidelink communication on an unlicensed spectrum.

BACKGROUND

In a wireless communication system, a communication device (e.g., user equipment (UE)) may communicate with another communication device via a data path supported by an operator's network, e.g., a cellular or a Wi-Fi network infrastructure. The data path supported by the operator network may include a base station (BS) and multiple gateways.

In sidelink communications, communication devices, which are relatively close to each other, may communicate with one another directly via a sidelink (SL), rather than being linked through the BS. The term "SL" may refer to a direct radio link established for communicating among devices, e.g., UEs, as opposed to communicating via the cellular infrastructure (uplink and downlink) as discussed above. The "SL" may also be referred to as a sidelink communication link. The sidelink communication link may be used in any suitable telecommunication network in accordance with various standards.

Sidelink communication may provide various advantages, for example, a relatively high transfer rate, a relatively low delay, etc. Moreover, during the sidelink communication, traffic concentrated at a base station can be distributed. Furthermore, a UE supporting sidelink communication may function as a relay node to extend the coverage of a base station.

BSs and UEs may operate in both a licensed spectrum and an unlicensed spectrum. There is a need for handling HARQ-ACK feedback transmission for sidelink communication on an unlicensed spectrum.

SUMMARY

Some embodiments of the present disclosure provide a method performed by a first user equipment (UE) for wireless communication. The method may include: receiving, from a second UE, sidelink control information (SCI) on a first interlace on a carrier, wherein the SCI may schedule data transmission on the carrier, and the first interlace may include evenly-spaced resource blocks (RBs) in frequency domain; and transmitting, from the first UE, corresponding to the data transmission, a hybrid automatic repeat request acknowledgement (HARQ-ACK) feedback on a first feedback resource based on the SCI.

Some embodiments of the present disclosure provide a method performed by a second user equipment (UE). The method may include: transmitting, to a first UE, sidelink control information (SCI) on a first interlace on a carrier, wherein the SCI may schedule data transmission on the carrier, and the first interlace may include evenly-spaced resource blocks (RBs) in frequency domain; and receiving, from the first UE, corresponding to the data transmission, a hybrid automatic repeat request acknowledgement (HARQ-ACK) feedback on a first feedback resource based on the SCI.

Some embodiments of the present disclosure provide an apparatus. According to some embodiments of the present disclosure, the apparatus may include: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry, wherein the computer-executable instructions cause the at least one processor to implement a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as 3GPP 5G (NR), 3GPP LTE Release 8, and so on. It is contemplated that along with the developments of network architectures and new service scenarios, all embodiments in the present disclosure are also applicable to similar technical problems; and moreover, the terminologies recited in the present disclosure may change, which should not affect the principles of the present disclosure.

Figure 1:
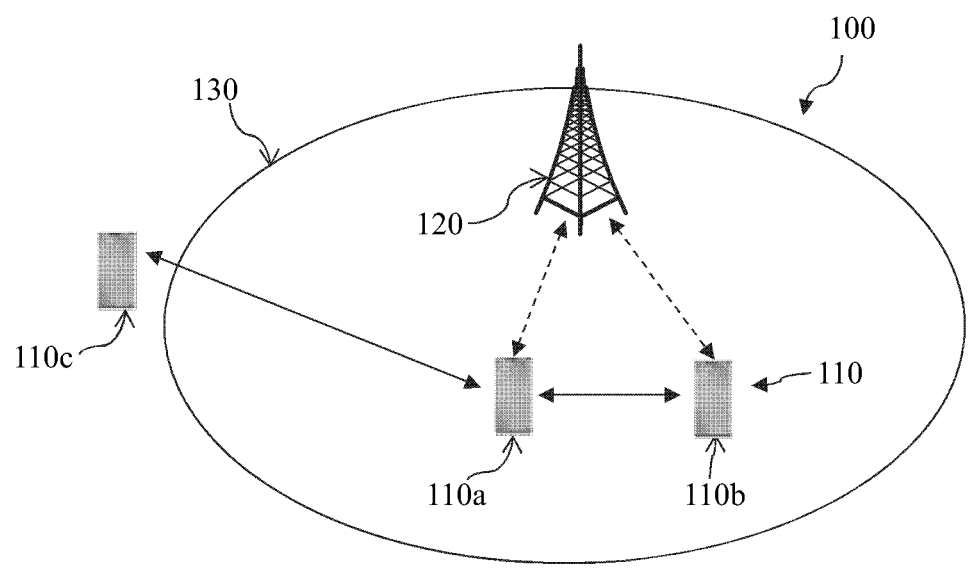
FIG. 1 illustrates a schematic diagram of a wireless communication system in accordance with some embodiments of the present disclosure.

FIG. 1 illustrates a schematic diagram of a wireless communication system 100 in accordance with some embodiments of the present disclosure.

As shown in FIG. 1, a wireless communication system 100 may include a base station (e.g., BS 120) and some UEs 110 (e.g., UE 110a, UE 110b, and UE 110c). Although a specific number of UEs 110 and one BS 120 are depicted in FIG. 1, it is contemplated that wireless communication system 100 may also include more BSs and more or fewer UEs in and outside of the coverage of the BSs.

The UEs and the base station may support communication based on, for example, 3G long-term evolution (LTE), LTE-advanced (LTE-A), new radio (NR), or other suitable protocol(s). For example, the BS 120 may include an eNB or a gNB. The UE 110a, UE 110b, or UE 110c may include, for example, but is not limited to, a computing device, a wearable device, a mobile device, an IoT device, a vehicle, etc. Persons skilled in the art should understand that as technology develops and advances, the terminologies described in the present disclosure may change, but should not affect or limit the principles and spirit of the present disclosure.

The BS 120 may define one or more cells, and each cell may have a coverage area 130. In the exemplary wireless communication system 100, some UEs (e.g., UE 110a and UE 110b) are within the coverage of the BS 120, which may not be a specific base station 120 shown in FIG. 1 and can be any one of the base stations 120 in a wireless communication system, and some UEs (e.g., UE 110c) are outside of the coverage of the BS 120. For example, in the case that the wireless communication system includes two base stations 120 with UE 110a being within the coverage of any one of the two base stations 120 means that UE 110a is within the coverage of a base station 120 (i.e., in-coverage) in the wireless communication system; and UE 110a being outside of the coverage of both base stations 120 means that UE 110a is outside the coverage of a base station 120 (i.e., out-of-coverage) in the wireless communication system.

Still referring to FIG. 1, the UE 110a and UE 110b may communicate with the BS 120 via, for example, a Uu link (denoted by dotted arrow in FIG. 1). The UE 110a, UE 110b, and UE 110c may communicate with each other via a sidelink (denoted by solid arrow in FIG. 1), and may form a UE group. During a sidelink communication, a transmitting UE (hereinafter referred to as "Tx UE") may transmit signaling, data, or both to a receiving UE (hereinafter referred to as "Rx UE"). For example, referring to FIG. 1, a Tx UE (e.g., UE 110a) may transmit data to an Rx UE (e.g., UE 110b or UE 110c).

BSs (e.g., BS 120 in FIG. 1) and UEs (e.g., UE 110a, UE 110b, and UE 110c in FIG. 1) may operate in both a licensed spectrum and an unlicensed spectrum. For example, the unlicensed spectrum may be at around 6 GHz or 60 GHz of carrier frequency. NR-U (NR system access on unlicensed spectrum) operating bandwidth may be an integer multiple of 20 MHz. In order to achieve fair coexistence between NR systems (e.g., NR-U systems) and other wireless systems, a channel access procedure, also known as a listen-before-talk (LBT) test, may be performed, in units of 20 MHz, before communicating on the unlicensed spectrum. For a bandwidth larger than 20 MHz, e.g., 40 MHz, 60 MHz, 80 MHz, or 100 MHz, the carrier bandwidth may be partitioned into subbands, each of which has a bandwidth of 20 MHz and may be indexed.

To perform the LBT test, energy detection may be performed on a certain channel. If the received power of the channel is below a predefined threshold, the LBT test may be determined as successful, and the channel may then be deemed as empty and available for transmission. Only when the LBT test is successful can a device (e.g., a UE) start transmission on the channel and occupy the channel up to a maximum channel occupancy time (MCOT). Otherwise, that is, if the LBT test is failed, the device cannot start any transmission on the channel, and may continue to perform another LBT test until a successful LBT test result. A BS or UE may perform the above LBT test per subband (e.g., 20 MHz per subband, which may also be referred to as an "LBT subband"), and may communicate on an available subband (s), if any.

In addition, wireless transmission on an unlicensed spectrum should meet the requirements of the regulations subject to the management of the country/region where a wireless communication device (e.g., a UE) is located. The design of an uplink waveform for NR-U PUSCH (Physical Uplink Shared Channel)/PUCCH (physical uplink control channel) should meet these regulation requirements on an unlicensed spectrum. Similarly, the design of a waveform for sidelink communication should also meet the above regulation requirements on an unlicensed spectrum.

The requirements mainly include two aspects:
(1) occupied channel bandwidth (OCB): the bandwidth containing 99% of the power of the signal, shall be between 80% and 100% of the declared Nominal Channel Bandwidth; and
(2) maximum power spectrum density (PSD) with a resolution bandwidth of 1 MHz (e.g., 10 dBm/MHz).

The above two requirements dictate that a signal which occupies a small portion of the channel bandwidth cannot be transmitted at the maximum available power at the UE due to the PSD and OCB constraints.

In Rel-14 LTE enhanced licensed assisted access (LTE eLAA), an interlace-based waveform is employed as an uplink waveform for an unlicensed spectrum. In LTE, the bandwidth of a carrier is 20 MHz. The 20 MHz bandwidth may include 100 physical resource blocks (PRBs), which are partitioned into 10 interlaces. Each interlace may include 10 PRBs and may be equally distributed within the whole bandwidth. In this way, each interlace spans more than 80% system bandwidth so that the regulation requirements of OCB can be met. Moreover, 10 PRBs of one interlace are equally spaced in frequency so that two adjacent PRBs of one interlace are separated by a 1.8 MHz distance, and thus power boosting can be realized for each PRB of one interlace.

To achieve power boosting under a PSD constraint and meet the regulatory requirements for OCB in NR systems, an interlace-based waveform may be applied to uplink (UL) transmission, as well as sidelink communication. As a frequency resource, an interlace may be defined as a set of common resource blocks (CRBs) which may be evenly spaced in frequency domain. The number of interlaces in the frequency domain may be dependent on the subcarrier spacing.

For example, assuming that there are M interlaces, indexed as 0, 1, ..., M−1, an interlace m, m∈{0, 1, ..., M−1} may consist of CRB {m,M+m,2M+m,3M+m, ...}. The relation between the interlaced resource block (IRB) $n_{IRB,m}^{\mu} \in \{0, 1, ...\}$ in bandwidth part (BWP) i, interlace m, and the common resource block $n_{CRB}^{\mu}$ is given by $n_{CRB}^{\mu}=Mn_{IRB,m}^{\mu}+N_{BWP,i}^{start,\mu}+((m-N_{BWP,i}^{start,\mu}) \mod M)$, where $N_{BWP,i}^{start,\mu}$ is the common resource block where bandwidth part i starts relative to common resource block 0; and µ indicates a subcarrier spacing (SCS). For example, "µ=0" may indicate a SCS of 15 kHz, "µ=1" may indicate a SCS of 30 kHz, "µ=2" may indicate a SCS of 60 kHz, and "µ=3" may indicate a SCS of 120 kHz. When there is no risk for confusion, the index µ may be dropped.

In some embodiments of the present disclosure, the number of interlaces distributed within the bandwidth of a carrier may be based on only the subcarrier spacing regardless of the bandwidth of the carrier. The subcarrier spacing of NR systems may be $15 \times 2^n$ kHz, where n is an integer. The subcarrier spacing may be 15 kHz, 30 kHz, or 60 kHz for frequency range 1 (FR1) and different subcarrier spacing values can support different maximum bandwidths. In some examples, for a carrier with 15 kHz subcarrier spacing, there may be 10 interlaces on the carrier. In some examples, for a carrier with 30 kHz subcarrier spacing, there may be 5 interlaces on the carrier. In some examples, for a carrier with 60 kHz subcarrier spacing, there may be 2 or 3 interlaces on the carrier. It should be understood that the number of interlaces (e.g., 10 interlaces for a carrier with 15 kHz subcarrier spacing, or 5 interlaces for a carrier with 30 kHz subcarrier spacing) is only for illustrative purposes, and should not be construed as limiting the embodiments of the present disclosure.

Table 1 below shows examples of NR bandwidth configurations for different subcarrier spacing. According to table 1, a maximum number of RBs (represented as $N_{RB}$ in table 1) may be determined based on the subcarrier spacing and corresponding bandwidth. For example, if the bandwidth is 20 MHz and the subcarrier spacing (SCS) is 15 kHz, the maximum number of RBs may be 106; and if the bandwidth is 20 MHz and the SCS is 30 kHz, the maximum number of RBs may be 51. It should be understood that table 1 is only for illustrative purposes, and should not be construed as limiting the embodiments of the present disclosure.

TABLE 1

| subcarrier spacing (SCS) (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 80 MHz $N_{RB}$ | 90 MHz $N_{RB}$ | 100 MHz $N_{RB}$ |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

In some embodiments of the present disclosure, the number of RBs of each interlace on a carrier may be dependent on the bandwidth of the carrier. For example, referring to table 1, if the carrier bandwidth is 20 MHz and the subcarrier spacing is 15 kHz, the maximum number of RBs included in the bandwidth may be 106. As mentioned above, for a carrier with 15 kHz subcarrier spacing, there may be 10 interlaces on the carrier. In this scenario, each of the 10 interlaces includes 10 or 11 RBs (106/10=10.6). If the carrier bandwidth is 20 MHz and the subcarrier spacing is 30 kHz, the maximum number of RBs included in the bandwidth may be 51. In this case, as mentioned above, for a carrier with 30 kHz subcarrier spacing, there may be 5 interlaces on the carrier. In this scenario, each of the 5 interlaces includes 10 or 11 RBs (51/5=10.2).

In some embodiments of the present disclosure, for carrier bandwidth larger than 20 MHz, the same spacing between consecutive RBs in an interlace is maintained for all interlaces regardless of the carrier bandwidth. In other words, the number of RBs per interlace may be dependent on the carrier bandwidth. Keeping the same interlace spacing with an increasing bandwidth is a straightforward and simple way to scale the interlace design from 20 MHz to a wider bandwidth.

For example, if the carrier bandwidth is 80 MHz and the subcarrier spacing is 30 kHz, according to table 1, the maximum number of RBs included in the bandwidth may be 217. Moreover, since the subcarrier spacing is 30 kHz, there are 5 interlaces on the carrier. In this scenario, each of the 5 interlaces may include 43 or 44 RBs (217/5=43.4).

Figure 2:
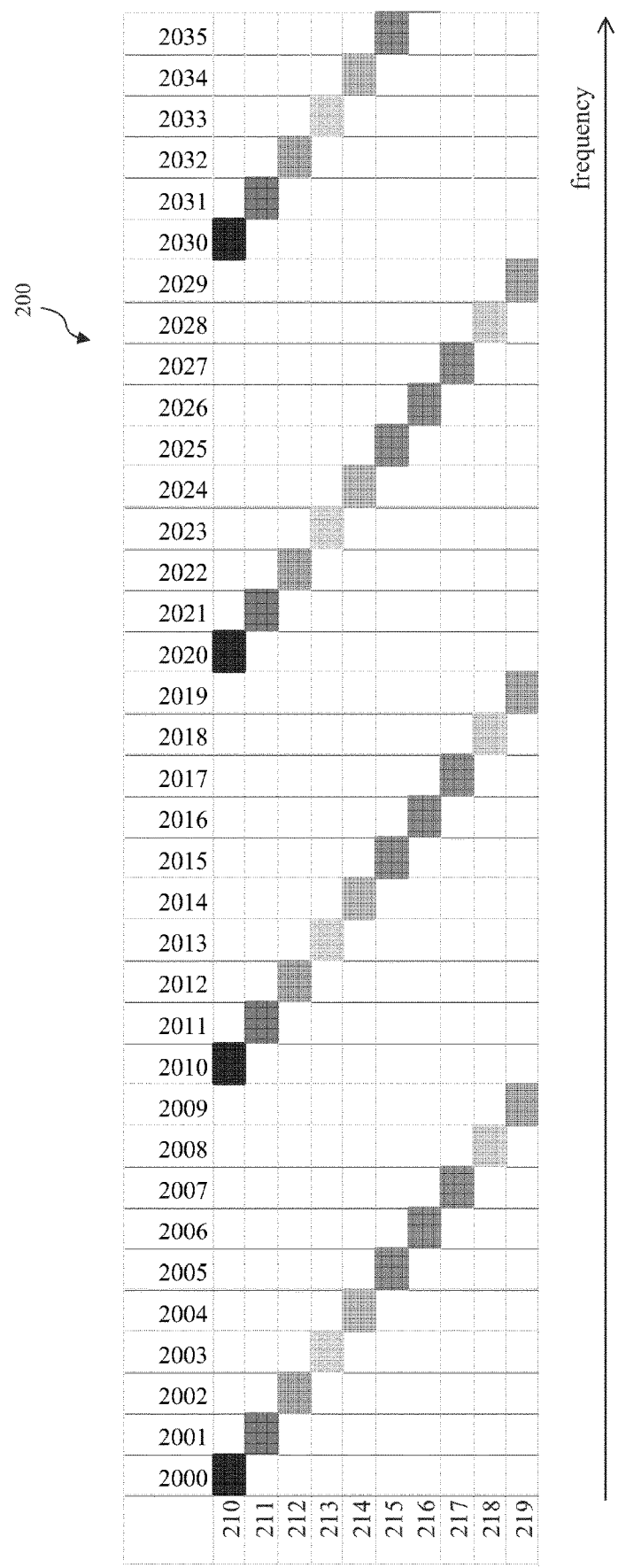
FIG. 2 illustrates an example of interlace-based resource block configuration according to some embodiments of the present disclosure.

FIG. 2 illustrates an example of interlace-based resource block configuration 200 for 15 kHz subcarrier spacing according to some embodiments of the present disclosure. It should be understood that configuration 200 is only for illustrative purposes, and should not be construed as limiting the embodiments of the present disclosure.

As shown in FIG. 2, carrier bandwidth may be partitioned into resource blocks (RBs). For an illustrative purpose, FIG. 2 only shows a part of the RBs (e.g., RBs that are represented with reference numerals 2000 to 2035 in FIG. 2) included in the carrier bandwidth. Persons skilled in the art can readily know the number of RBs included in a certain carrier bandwidth by referring to, for example, table 1 as shown above. For example, assuming that the carrier bandwidth is 15 MHz, the carrier bandwidth may include 79 RBs; and assuming that the carrier bandwidth is 20 MHz, the carrier bandwidth may include 106 RBs.

As mentioned above, the number of interlaces distributed within the bandwidth of a carrier may be based on only the subcarrier spacing regardless of the bandwidth of the carrier. In the example of FIG. 2, the RBs of the carrier bandwidth are partitioned into 10 interlaces (corresponding to the 15 kHz subcarrier spacing), which are represented with reference numerals 210, 211, 212, 213, 214, 215, 216, 217, 218, and 219 in FIG. 2.

Each interlace of the 10 interlaces may include evenly-spaced RBs in frequency domain. The number of RBs included in each of the 10 interlaces may depend on the carrier bandwidth. As shown in FIG. 2, interlace 210 may include RB 2000, RB 2010, RB 2020, RB 2030, and so on; interlace 211 may include RB 2001, RB 2011, RB 2021, RB 2031, and so on; and interlace 219 may include RB 2009, RB 2019, RB 2029, and so on. RB 2000 to RB 2035 may be indexed from "0" to "35" along the frequency axis, and interlaces 210 to 219 may be indexed from "0" to "9."

Figure 3:
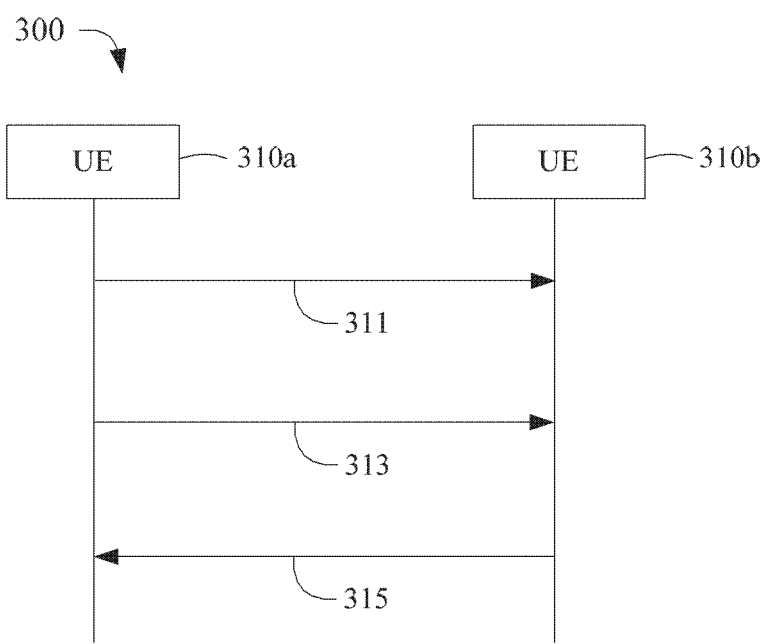
FIG. 3 illustrates a flow chart of an exemplary procedure for sidelink transmission according to some embodiments of the present disclosure.

FIG. 3 illustrates a flow chart of an exemplary procedure 300 for sidelink transmission according to some embodiments of the present disclosure. Details described in all of the foregoing embodiments of the present disclosure are applicable for the embodiments shown in FIG. 3.

The exemplary procedure 300 shows a procedure of a UE (e.g., UE 310a) communicating with another UE (e.g., UE 310b). In some examples, each of UE 310a and UE 310b may function as UE 110a, UE 110b, or UE 110c in FIG. 1.

Details described in all of the foregoing embodiments of the present disclosure are applicable for the embodiments shown in FIG. 3. It should be appreciated by persons skilled in the art that the sequence of the operations in exemplary procedure 300 may be changed and some of the operations in exemplary procedure 300 may be eliminated or modified, without departing from the spirit and scope of the disclosure.

Referring to FIG. 3, in operation 311, UE 310a may transmit sidelink control information (SCI) to UE 310b on physical sidelink control channel (PSCCH). The SCI may schedule associated data (e.g., physical sidelink shared channel (PSSCH)) transmission. In operation 313, UE 310a may transmit the associated data to UE 310b according to the SCI.

In some cases, the SCI and the associated data may be transmitted from UE 310a to UE 310b in a unicast transmission. In some other cases, the SCI and the associated data may be transmitted from UE 310a to a group of UEs including UE 310b in a groupcast transmission. In yet other cases, the SCI and the associated data may be transmitted from UE 310a to some UEs including UE 310b in a broadcast transmission.

Under certain circumstances, corresponding feedback (e.g., HARQ-ACK feedback) may be required in response to the reception of the associated data (e.g., PSSCH) from an Rx UE (e.g., UE 310b) to a Tx UE (e.g., UE 310a). The broadcast transmission may not require a HARQ-ACK feedback. The unicast transmission and groupcast transmission may enable HARQ-ACK feedback in some scenarios.

For example, referring to FIG. 3, UE 310b may generate a negative acknowledgement (NACK) if it cannot correctly decode the PSSCH; otherwise, UE 310b may generate a positive acknowledgement (ACK). In operation 315, UE 310b may transmit a HARQ-ACK feedback to UE 310a in response to the associated data (e.g., PSSCH). A HARQ-ACK feedback bit value of 0 may represent a NACK while a HARQ-ACK feedback bit value of 1 may represent an ACK.

HARQ-ACK feedback for PSSCH may be carried on a physical sidelink feedback channel (PSFCH). For unicast transmissions, an Rx UE may reply with either an ACK or NACK on the PSFCH. In this case, for a given PSSCH transmission, one feedback resource for the PSFCH would be enough.

For groupcast transmissions, there are two options for feedback. One option (option 1) is to reserve only a common NACK resource for all group members (i.e., NACK only feedback). In other words, when HARQ-ACK feedback for groupcast option 1 is enabled, all Rx UEs in the group share one feedback resource for a PSFCH (hereinafter also referred to as "PSFCH resource"). Any Rx UE may transmit NACK on the PSFCH resource when it does not correctly decode the PSSCH, and may transmit nothing (e.g., do not perform transmission) on the PSFCH resource when it correctly decodes the PSSCH.

The other option (option 2) is to reserve group member specific ACK/NACK resources (i.e., ACK/NACK feedback). In other words, when HARQ-ACK feedback for groupcast option 2 is enabled, each of the Rx UEs may have a separate PSFCH resource. An Rx UE may transmit NACK on the PSFCH resource when it does not correctly decode the PSSCH, and may transmit ACK on the PSFCH resource when it correctly decodes the PSSCH.

Therefore, for groupcast option 1, one PSFCH resource would be enough; and for groupcast option 2, multiple feedback resources may be required, depending on the number of Rx UEs in the group. For groupcast HARQ feedback, the SCI may indicate either option 1 or option 2 is to be used by an Rx UE.

As mentioned above, an interlace-based waveform may be employed in an unlicensed spectrum to meet the regulatory requirements of OCB and PSD. In this scenario, solutions need to be provided for applying the interlace-based waveform to sidelink communication such as PSCCH, PSSCH, and PSFCH transmissions on an unlicensed spectrum.

Embodiments of the present disclosure provide solutions for applying an interlace-based waveform to sidelink communication on an unlicensed spectrum, so as to meet the above regulation requirements. More details on the embodiments of the present disclosure will be illustrated in the following text in combination with the appended drawings.

In some embodiments of the present disclosure, a SCI may be transmitted on an interlace (e.g., interlace 210 in FIG. 2) on a carrier, and may schedule data transmission on the carrier. The data transmission may be transmitted on one or more interlaces on the carrier (e.g., interlace 215 in FIG. 2). A HARQ-ACK feedback corresponding to a certain data transmission may be transmitted on an interlace. In other words, when the unlicensed spectrum is extended to transmit the PSFCH, which carries the HARQ-ACK feedback, the unit for resource allocation may be an interlace.

Therefore, for unicast transmission or groupcast option 1 transmission, one interlace may be needed to transmit a PSFCH corresponding to a given PSSCH. For a groupcast option 2 transmission, one or more interlaces may be needed to transmit PSFCHs from one or more Rx UEs in a group. Accordingly, solutions need to be provided for an Rx UE to determine which feedback resource (e.g., interlace(s)) can be used to transmit the HARQ-ACK feedback. An interlace for transmitting the PSFCH or HARQ-ACK feedback may also be referred to as a PSFCH interlace.

However, there are some drawbacks to the above resource allocation scheme for a wideband interlace structure. As mentioned above, the number of interlaces distributed within the bandwidth of a carrier may be based on only the subcarrier spacing regardless of the bandwidth of the carrier. For example, for a carrier with 15 kHz subcarrier spacing, there may be 10 interlaces on the carrier; and for a carrier with 30 kHz subcarrier spacing, there may be 5 interlaces on the carrier. Referring to the above table 1, if the carrier bandwidth is 20 MHz and the subcarrier spacing is 15 kHz, each of the 10 interlaces may include 11 or 10 RBs. If the carrier bandwidth is 40 MHz and the subcarrier spacing is 15 kHz, each of the 10 interlaces may include 22 or 21 RBs. If the carrier bandwidth is 80 MHz and the subcarrier spacing is 30 kHz, each of the 5 interlaces may include 44 or 43 RBs. Clearly, one interlace may provide too many resources for PSFCH transmission since a HARQ-ACK feedback indicating NACK or ACK may occupy only 1 bit.

In addition, user multiplexing capacity may also be relatively low since one interlace only supports one HARQ-ACK feedback from a certain user. For example, for the 15 kHz subcarrier spacing, there are 10 interlaces in total, which can support up to 10 PSFCH interlaces in a slot. For the 30 kHz subcarrier spacing, there are 5 interlaces in total, which support up to 5 PSFCH interlaces in a slot. User capacity needs to be increased.

To improve resource utilization efficiency, a partial interlace may be employed as the unit for resource allocation. For example, an interlace (hereinafter also referred to as "a full interlace") may be divided into several partial interlaces with each partial interlace restricted in a LBT subband (e.g., a 20 MHz subband). For example, if the carrier bandwidth is 80 MHz, a full interlace may be divided into 4 partial interlaces. In some embodiments of the present disclosure, a PSFCH may be transmitted on a partial interlace, instead of a full interlace.

By dividing an interlace into a number of partial interlaces, resource utilization efficiency can be improved since as mentioned above, a full interlace may include too many RBs for PSFCH transmission. Moreover, the segmentation of interlace can not only satisfy the above mentioned OCB requirement, but also improve PSFCH capacity.

Another or a further solution to improve resource utilization efficiency may be exploring PSFCH multiplexing in the code domain. For example, cyclic shift in time domain, frequency domain orthogonal cover code (OCC), or both may be employed to enable PSFCH transmission from a plurality of UEs on the same interlace, or on the same partial interlace when one full interlace is divided into several partial interlaces. A UE may determine a corresponding cyclic shift, frequency domain OCC, or both based on an SCI and the associated PSSCH transmission from another UE.

Sidelink resource pool(s) including resources for sidelink communication or sidelink resources may be assigned to a UE for sidelink operations. The sidelink resource pool(s) may be scheduled by a base station or may be pre-configured at a UE, for example, during the manufacture of the UE according to industrial standard(s). A PSFCH resource pool may be configured (or pre-configured) for every S contiguous slots. In other words, PSSCH transmissions in the S contiguous slots may be acknowledged in one slot for PSFCH transmission. For example, a PSFCH resource pool may be configured in a fourth slot of every 4 slots (i.e., S=4).

Figure 4:
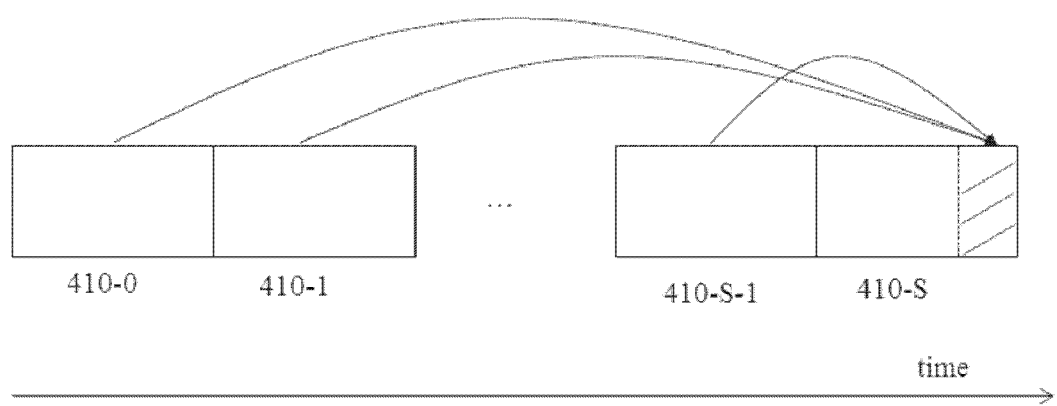
FIG. 4 illustrates an example mapping relationship between PSSCH transmissions and PSFCH transmissions according to some embodiments of the present disclosure.

FIG. 4 shows an example mapping relationship between PSSCH transmissions and PSFCH transmissions. Details described in all of the foregoing embodiments of the present disclosure are applicable for the embodiments shown in FIG. 4.

Referring to FIG. 4, PSSCH transmissions may be transmitted in S contiguous slots (e.g., slot 410-0, slot 410-1, . . . , slot 410-S-1), and may be acknowledged in a single slot (e.g., slot 410-S). In other words, the S contiguous slots include slots with corresponding PSFCH transmissions in the same slot (hereinafter referred to as "PSFCH slot"). In FIG. 4, the PSFCH transmissions may be transmitted in a final few symbols (for example, the last two available symbols) of a PSFCH slot.

The S contiguous slots may hereinafter be referred to as "a slot set for data transmission" or "a slot set for PSSCH transmission." Each slot in the S contiguous slots may hereinafter be referred to as "a slot for data transmission" or "a slot for PSSCH transmission."

Although in FIG. 4, the PSSCH transmissions are acknowledged in a slot (e.g., slot 410-S) different from the slot set for PSSCH transmission, it is contemplated that the PSSCH transmissions may also be acknowledged in a slot in the slot set for PSSCH transmission (e.g., the last slot of the slot set).

Figure 5:
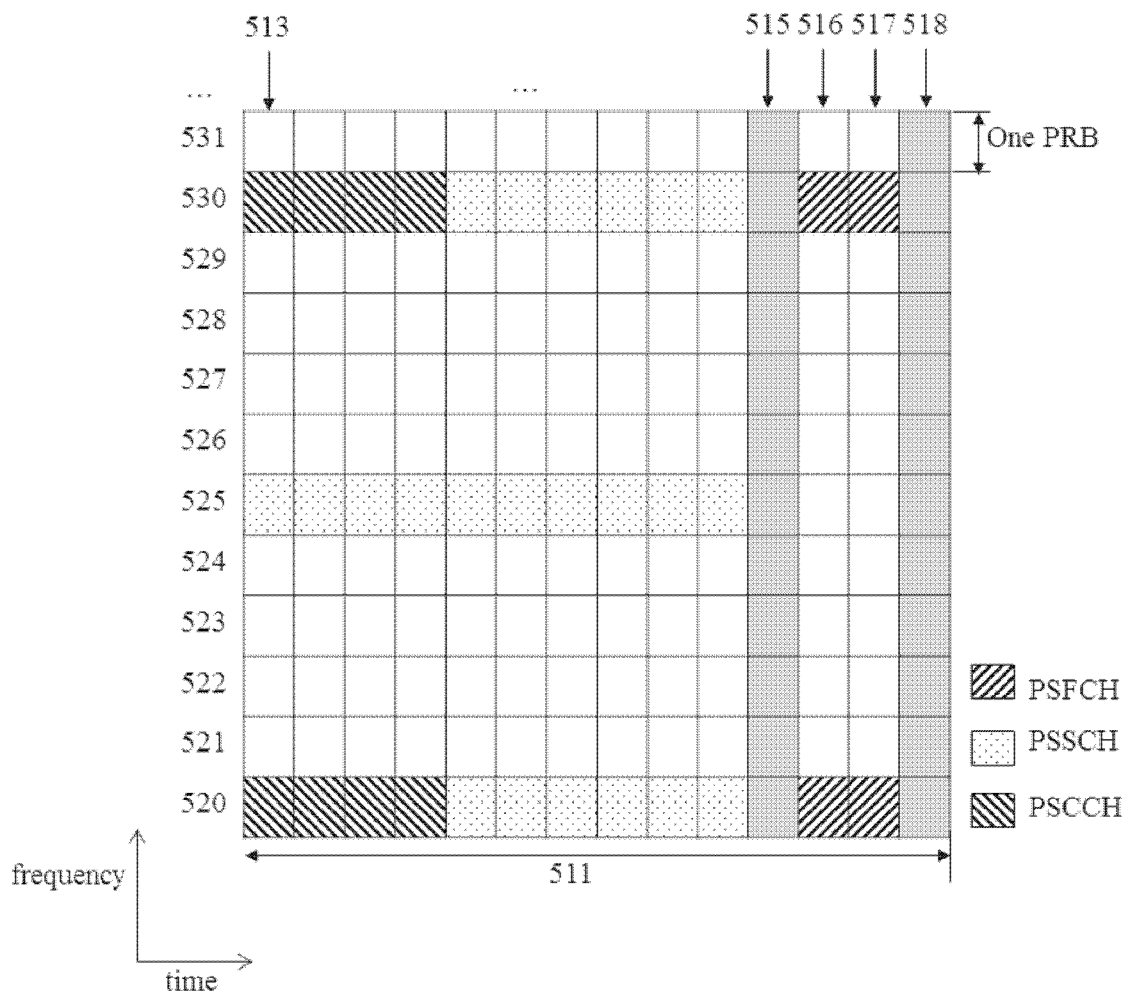
FIG. 5 illustrates an example resource configuration in a slot according to embodiments of the disclosure.

FIG. 5 shows an example resource configuration in a slot according to embodiments of the disclosure. Details described in all of the foregoing embodiments of the present disclosure are applicable for the embodiments shown in FIG. 5.

In FIG. 5, carrier bandwidth in slot 511 may be partitioned into PRBs. For an illustrative purpose, FIG. 5 only shows a part of the PRBs (e.g., PRBs that are represented with reference numerals 520 to 531 in FIG. 5) included in the carrier bandwidth. Persons skilled in the art can readily know the number of PRBs included in a certain carrier bandwidth by referring to, for example, table 1 as shown above. Assuming that the subcarrier spacing is 15 kHz, and there are 10 interlaces on the carrier indexed as "0" to "9," respectively, interlace 0 may include PRB 520, PRB 530 and so on; interlace 1 may include PRB 521, PRB 531 and so on; and interlace 9 may include PRB 529 and so on.

In FIG. 5, both frequency-division multiplexing (FDM) based and time-division multiplexing (TDM) based transmissions are supported. It is contemplated that in some other embodiments of the present disclosure, pure TDM-based transmission or pure FDM-based transmission may be supported.

Slot 511 may include 14 symbols (e.g., orthogonal frequency division multiplexing (OFDM) symbols). The first symbol 513 within slot 511 may be used for automatic gain control (AGC), and symbols 515 and 518 may be reserved for LBT test. PSCCH may be transmitted on interlace 0 in the first four symbols within slot 511, some of the remaining symbols within slot 511 on interlace 0 may be used to transmit PSSCH (i.e., TDM-based transmission). PSSCH may also be transmitted on interlace 5 within slot 511 (i.e., FDM-based transmission). PSFCH may be transmitted on interlace 0 in the last two available symbols (e.g., symbols 516 and 517 within slot 511 since symbols 515 and 518 are reserved for LBT test).

As mentioned above, PSFCH multiplexing may be implemented in frequency domain (e.g., partial interlaces), code domain (e.g., cyclic shift, OCC, or both), or both. In these embodiments, in a given slot within a PSFCH resource pool (e.g., symbols 516 and 517 within slot 511), there are may be Z candidate PSFCH resources, wherein Z may be determined based on one or more of the following:

the number of full interlaces defined based on subcarrier spacing of the carrier (denoted as M), the number of partial interlaces per full interlace (denoted as N), the number of cyclic shifts per full or partial interlace (denoted as X), and the number of frequency domain OCCs per full or partial interlace (denoted as Y).

The Z candidate PSFCH resources in the PSFCH resource pool may be indexed from "0" to "Z−1." In some embodiments of the present disclosure, the number of PSFCH resources (i.e., Z) in the PSFCH resource pool may be determined according to Z=M×N×X×Y.

In some embodiments of the present disclosure, the number of PSFCH resources (i.e., Z) in the PSFCH resource pool may be the same as the number of full interlaces defined based on subcarrier spacing of a carrier (i.e., Z=M). In these embodiments, a HARQ-ACK feedback may be transmitted on a full interlace, which may be considered as a special instance of PSFCH multiplexing. In the case of 10 interlaces (i.e., Z=M=10) for a carrier with 15 kHz subcarrier spacing, the candidate PSFCH resources in a PSFCH resource pool may be indexed from "0" to "9."

As will be described below, embodiments of the present disclosure provide solutions for determining feedback resources among the plurality of candidate PSFCH resources to transmit HARQ-ACK feedback.

In some embodiments of the present disclosure, a joint PSFCH resource indication scheme may be employed for determining the feedback resources to transmit HARQ-ACK feedback.

As mentioned above, for unicast and groupcast option 1 transmissions, one feedback resource would be enough. In this case, in some embodiments of the present disclosure, a UE may transmit an SCI indicating an index of a PSFCH resource among a plurality of candidate PSFCH resources (e.g., Z candidate PSFCH resources) in the PSFCH resource pool. For example, the SCI may indicate PSFCH resource n (n=0, 1, . . . , or Z−1) as the feedback resource for transmitting HARQ-ACK feedback corresponding to the data (e.g., PSSCH) scheduled by the SCI. An Rx UE may transmit HARQ-ACK feedback on PSFCH resource n based on the SCI. The value of the HARQ-ACK feedback may be dependent on the decoding result of the data.

In some embodiments of the present disclosure, the index of the PSFCH resource for transmitting the HARQ-ACK feedback may be implicitly determined according to a certain criterion. The criterion may be configured by a BS or may be predefined according to, for example, industrial standard(s). This is beneficial because it can save signaling overhead.

In some examples, a linkage between the index of the PSFCH resource (denoted as z) and the slot index (denoted as i) of a slot within a slot set for data transmission and an interlace index (denoted as j) may be established. The slot set may include slots (e.g., slot 410-0 to slot 410-S−1 in FIG. 4) with corresponding PSFCH transmissions in the same slot. The value of j may be based on the interlace index for SCI transmission (e.g., interlace 0 in FIG. 5), the interlace index for PSSCH transmission (e.g., interlace 0 or 5 in FIG. 5), or a combination thereof (e.g., j=the interlace index for SCI transmission+the interlace index for PSSCH transmission). In the case that an SCI schedules a plurality of interlaces for PSSCH transmission (e.g., interlaces 0 and 5 in FIG. 5), the interlace index for PSSCH transmission may be the lowest interlace index (e.g., interlace 0 in FIG. 5), the highest interlace index (e.g., interlace 5 in FIG. 5), or a pre-configured interlace index of the plurality of interlaces for PSSCH transmission. In the above examples, PSFCH resource collision may be avoided since one interlace is generally used to transmit only one SCI in one slot.

A UE may determine the index of the PSFCH resource among a plurality of candidate PSFCH resources based on one or more of the following: M, i, and j. In some embodiments of the present disclosure, the UE may determine the index of the PSFCH resource according to z=M×i+j. For example, assuming that a PSSCH transmission is transmitted in the ith slot of the slot set for PSSCH transmission, where i>=0, a UE may determine that a HARQ-ACK feedback corresponding to the PSSCH transmission will be transmitted on a PSFCH resource indexed as M×i+j.

In some cases, two or more Tx UEs in a UE group may simultaneously transmit SCI or PSSCH on the same interlace to the same Rx UE in the UE group. In this case, PSFCH collision may occur due to the same slot and the same interlace. To solve this potential collision, the ID of the Tx UE, e.g., the source ID of the Tx UE indicated in the associated SCI, may be employed during the determination of the index of the PSFCH resource. For example, the index of the PSFCH resource may be determined according to z=(M×i+j+$K_1$) mod Z, wherein $K_1$ represents the source ID of a Tx UE, and Z represents the number of PSFCH resources in the PSFCH resource pool as described above. The source ID of a UE may include 16 bits, and may be indicated in the SCI from the UE.

For groupcast option 2 transmission, a plurality of feedback resources may be required. In this case, in some embodiments of the present disclosure, a plurality of feedback resource sets for accommodating feedbacks from a plurality of UE groups may be configured by a radio resource control (RRC) signaling for a BS to a UE. The feedback resources in the plurality of feedback resource sets may be from the plurality of candidate PSFCH resources (Z candidate PSFCH resources in the PSFCH resource pool). In some examples, the numbers of feedback resources in the plurality of feedback resource sets may be different so as to provide different PSFCH resources for UE groups of different group sizes. In some examples, the numbers of feedback resources in the plurality of feedback resource sets may be the same.

From the perspective of a Tx UE which transmits an SCI, the Tx UE may select a feedback resource set from the plurality of feedback resource sets according to, for example, the number of member UEs in the UE group. The Tx UE may then indicate the selected feedback resource set in the SCI to be transmitted. From the perspective of an Rx UE which is expected to receive an SCI and the associated data, the Rx UE may determine a corresponding feedback resource set according to the SCI. The Rx UE may implicitly determine a feedback resource for corresponding PSFCH transmission in the determined feedback resource set according to a certain criterion. For example, the Rx UE may determine a feedback resource based on the result of an ID of the Rx UE in the UE group modulo the number of feedback resources in the feedback resource set. That is, the feedback resources in the determined feedback resource set may be indexed from 0 to q−1, where q is the number of feedback resources in the determined feedback resource set; and the index of the determined feedback resource in the determined feedback resource set is the result of the above modulo operation. The Rx UE may then transmit a HARQ-ACK feedback (e.g., ACK or NACK) on the determined feedback resource. The ID of the Rx UE in the UE group is configured by the Tx UE or a BS via a high layer (e.g., RRC layer) signaling.

In some embodiments of the present disclosure, the indices of the PSFCH resources for transmitting the HARQ-ACK feedback may be implicitly determined according to a certain criterion. The criterion may be configured by a BS, a Tx UE or may be predefined according to, for example, industrial standard(s). This is beneficial because it can save signaling overhead.

In some examples, a linkage between the index of the PSFCH resource (denoted as z) and the ID of an Rx UE (denoted as $K_2$), which receives the groupcast option 2 transmission, may be established. For example, a UE may determine the index of the PSFCH resources for transmitting the HARQ-ACK feedback among a plurality of candidate PSFCH resources based on one or more of the following:

the number of slots (e.g., S) within the slot set for PSSCH transmission, wherein the slot set includes slots with corresponding PSFCH transmissions in the same slot; and the source ID of the Tx UE indicated in the SCI or the ID of the Tx UE in the UE group (e.g., $K_1$);

the ID of the Rx UE in the UE group (e.g., $K_2$); and the number of full interlaces defined based on subcarrier spacing of the carrier (e.g., M).

In some embodiments of the present disclosure, the UE may determine the index of the PSFCH resource according to z=(M×S+$K_1$+$K_2$) mod Z, wherein, as stated above, Z represents the number of candidate PSFCH resources in the PSFCH resource pool. In these embodiments, the first M×S candidate PSFCH resources of the Z candidate PSFCH resources in the PSFCH resource pool may be reserved for unicast transmission and groupcast option 1 transmission, and the remaining candidate PSFCH resources may be used for groupcast option 2 transmission.

In some embodiments of the present disclosure, a separate PSFCH resource indication scheme may be employed for determining the feedback resources to transmit HARQ-ACK feedback.

The separate PSFCH resource indication scheme may include one or more of the following steps: (1) slot determination; (2) full interlace determination or partial interlace determination; and (3) cyclic shift determination, OCC determination, or both. For example, a UE may determine the slot in which a HARQ-ACK feedback is transmitted (i.e., time domain), determine the full interlace or partial interlace on which the HARQ-ACK feedback is transmitted locates (i.e., frequency domain), and determine the cyclic shift, OCC, or both to be used for generating the HARQ-ACK feedback (i.e., code domain).

In some embodiments of the present disclosure, slot determination may be based on resource pool (e.g., PSFCH resource pool) configuration. In some embodiments of the present disclosure, slot determination may be based on the received SCI. For example, the SCI may indicate a slot level offset between a slot of data (e.g., PSSCH) transmission and a slot for a corresponding HARQ-ACK feedback (e.g., PSFCH) transmission. In some embodiments, a resource pool for PSFCH may be configured via slot-based bitmap, e.g., using bit 0 or 1 indicating whether the corresponding slot is within the PSFCH resource pool. In this case, the aforementioned slot level offset between PSSCH and PSFCH may be not necessary to be included in the SCI.

In some embodiments of the present disclosure, the unit for feedback resource allocation may be a full interlace. In these embodiments, in some examples, an SCI may indicate the index of a full interlace. The HARQ-ACK feedback corresponding to the data transmission scheduled by the SCI may be transmitted on the indicated full interlace.

In some other examples, the interlace index for feedback transmission may be implicitly determined. For example, the index of the interlace for PSFCH transmission may be the same as the index of the interlace where the SCI is detected. In other words, the HARQ-ACK feedback corresponding to the data transmission scheduled by the SCI may be transmitted on the same interlace where the SCI is detected. In another example, the index of the interlace for PSFCH transmission may be the same as the index of the interlace on which a scheduled PSSCH is transmitted. In the case that the PSSCH transmission scheduled by an SCI is transmitted on a plurality of interlaces, the interlace index for PSFCH transmission may be the one with the lowest interlace index, the highest interlace index, or a pre-configured interlace index of the plurality of interlaces for PSSCH transmission.

In some embodiments of the present disclosure, the unit for feedback resource allocation may be a partial interlace. In these embodiments, in some examples, an SCI may indicate an index of a full interlace and an index of a subband (e.g., LBT subband, or a RB set configured by a RRC signaling) of the carrier. The HARQ-ACK feedback corresponding to the data transmission scheduled by the SCI may be transmitted on a partial interlace of the full interlace corresponding to the index of the subband of the carrier.

In some other examples, the SCI may only indicate the index of the subband of the carrier, but not indicate the index of the full interlace, which may be implicitly determined. For example, the index of the full interlace for PSFCH transmission may be the same as the index of the full interlace where the SCI is detected. In another example, the index of the full interlace for PSFCH transmission may be the same as the index of the interlace on which a scheduled PSSCH is transmitted. In the case that the PSSCH transmission scheduled by an SCI is transmitted on a plurality of interlaces, the interlace index for PSFCH transmission may be the one with the lowest interlace index, the highest interlace index, or a pre-configured interlace index of the plurality of interlaces for PSSCH transmission.

In some other examples, an SCI may indicate the index of a partial interlace. The HARQ-ACK feedback corresponding to the data transmission scheduled by the SCI may be transmitted on the indicated partial interlace. For example, in the case that there are 10 interlaces for a certain carrier and each interlace is divided into 4 partial interlaces (e.g., a carrier with 15 kHz subcarrier spacing and 80 MHz bandwidth), the partial interlaces for the carrier may be indexed jointly from "0" to "39." In this scenario, a partial interlace can be identified by its index.

In some embodiments of the present disclosure, an SCI may indicate a cyclic shift, OCC, or both to be used for generating a HARQ-ACK feedback. In some embodiments of the present disclosure, the cyclic shift, OCC, or both may be determined implicitly. For example, assuming that it is determined that the HARQ-ACK feedback is to be transmitted in one or more symbols (e.g., slots 516 and 517 in FIG. 5) within a slot, the cyclic shift, OCC, or both may be determined based on at least one of the following:

an index of the slot within a radio frame;
an index of the one or more symbols (e.g., slots 516 and 517 in FIG. 5) within the slot; and
an index of the one or more symbols with respect to the first symbol (e.g., slot 516 in FIG. 5) of the one or more symbols in the time domain.

The HARQ-ACK feedback may be transmitted in sequence, e.g., one sequence indicates "ACK" and another sequence indicates "NACK." This sequence may be generated based on at least one of the cyclic shift and other information such as slot index or OFDM symbol index, etc. The OCC in time domain or frequency domain may be used to multiplex multiple UEs in the same PRB for PSFCH transmission. The index of OCC in time domain or frequency domain may be configured by a high layer (e.g., RRC layer) signaling or indicated implicitly.

For example, the sequence x(n) shall be generated according to $x(n)=r_{u,v}^{a,\delta}(n)$, wherein n is the index of each element of the sequence and dependent on the sequence length. The cyclic shift a varies as a function of the symbol and slot number according to $$\alpha_l = \frac{2\pi}{N_{sc}^{RB}}\left(\left(m_0 + m_{cs} + m_{int} + n_{cs}\left(n_{s,f}^{\mu}, l + l'\right)\right) \bmod N_{sc}^{RB}\right).$$

l is the OFDM symbol number in the PSFCH transmission where l=0 corresponds to the first OFDM symbol of the PSFCH transmission; l' is the index of the OFDM symbol in the slot that corresponds to the first OFDM symbol of the PSFCH transmission in the slot; $m_0$ is given by index of cyclic shift pair; $m_{cs}$ is determined based on ACK or NACK; and $m_{int}$ is given by $m_{int}=5n_{IRB}^{\mu}$ for PUCCH formats 0 and 1 if PUCCH shall use interlaced mapping, where $n_{IRB}^{\mu}$ is the resource block number within the interlace, and otherwise, $m_{int}=0$. The function $n_{cs}(n_c,l)$ is given by $n_{cs}(n_{s,f}^{\mu}l)$ $=\Sigma_{m=0}^{7}2^{m}c(8N_{symb}^{slot}n_{s,f}^{\mu}+8l+m)$, where c(i) is a pseudo-random sequence. The pseudo-random sequence generator shall be initialized with $c_{init}=n_{ID}$, where $n_{ID}$ is given by a higher-layer parameter hopping ID if configured, and otherwise $n_{ID}=N_{ID}^{cell}$. The above parameters for determining the cyclic shift and OCC are defined in 3GPP specification TS 38.211 and TS38.213.

Figure 6:
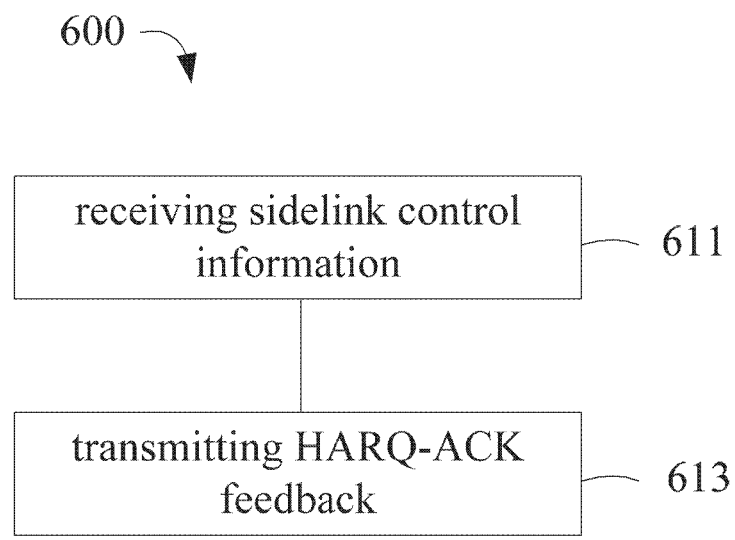
FIG. 6 illustrates a flow chart of a method for wireless communications according to some embodiments of the present disclosure.

FIG. 6 illustrates a flow chart of an exemplary procedure 600 for wireless communications according to some embodiments of the present disclosure.

The exemplary procedure 600 shows a procedure of a UE (e.g., UE 310b in FIG. 3) communicating with another UE (e.g., UE 310a in FIG. 3). Details described in all of the foregoing embodiments of the present disclosure are applicable for the embodiments shown in FIG. 6.

Referring to FIG. 6, in operation 611, a UE (e.g., UE 310b in FIG. 3) may receive sidelink control information (SCI) on an interlace on a carrier from another UE (e.g., UE 310a in FIG. 3). The SCI may be transmitted in a unicast transmission or a groupcast transmission (option 1 or option 2). The SCI may schedule data transmission (e.g., PSSCH) on the carrier. The interlace on which the SCI is detected may include evenly-spaced resource blocks (RBs) in frequency domain. The UE may receive the data transmission (e.g., PSSCH) from the another UE according to the SCI (not shown in FIG. 6). In operation 613, the UE (e.g., UE 310b in FIG. 3) may transmit a HARQ-ACK feedback corresponding to the data transmission on a feedback resource based on the SCI to the another UE (e.g., UE 310a in FIG. 3).

In some embodiments of the present disclosure, the feedback resource may be from a plurality of feedback resources, for example, Z candidate PSFCH resources in the PSFCH resource pool as described above with respect to FIGS. 2-5. In some embodiments of the present disclosure, the SCI may indicate an index of the feedback resource in the plurality of feedback resources. In some embodiments of the present disclosure, the UE may implicitly determine an index of the feedback resource in the plurality of feedback resources, as described above with respect to FIGS. 2-5. For example, the index of the feedback resource may be determined based on the equation $z=M\times i+j$, $z=(M\times i+j+K_1)$ mod $Z$ or $z=(M\times S+K_1+K_2)$ mod $Z$.

In some embodiments of the present disclosure, the UE may further receive a radio resource control (RRC) signaling. The RRC signaling may indicate a plurality of feedback resource sets for accommodating feedbacks from a plurality of UE groups, as described above with respect to FIGS. 2-5. In these embodiments, the received SCI may include an index of a feedback resource set of the plurality of feedback resource sets. The UE may determine the feedback resource from the indicated feedback resource set, according a method as described above with respect to FIGS. 2-5. For example, the UE may determine the index of the feedback resource in the indicated feedback resource set based on the result of an ID of the UE in the UE group modulo a number of feedback resources in the indicated feedback resource set.

In some embodiments of the present disclosure, the UE may further determine a slot for transmitting the HARQ-ACK feedback based on a resource pool configuration or the received SCI. The received SCI may indicate a slot level offset between a slot for data transmission and a slot for a corresponding HARQ-ACK feedback transmission. The UE may also determine one or more symbols within the slot for transmitting the HARQ-ACK feedback.

In these embodiments, the UE may further determine a full interlace or a partial interlace for transmitting the HARQ-ACK feedback based on the received SCI, as described above with respect to FIGS. 2-5. For example, the SCI may indicate an index of a full interlace on which the HARQ-ACK feedback is transmitted.

In these embodiments, the UE may further generate the HARQ-ACK feedback using a cyclic shift, an orthogonal cover code (OCC), or both. As described above with respect to FIGS. 2-5, an index of the cyclic shift, or an index of the OCC, or both may be indicated in the received SCI, or may be implicitly determined.

It should be appreciated by persons skilled in the art that the sequence of the operations in exemplary procedure 600 may be changed and some of the operations in exemplary procedure 600 may be eliminated or modified, without departing from the spirit and scope of the disclosure.

Figure 7:
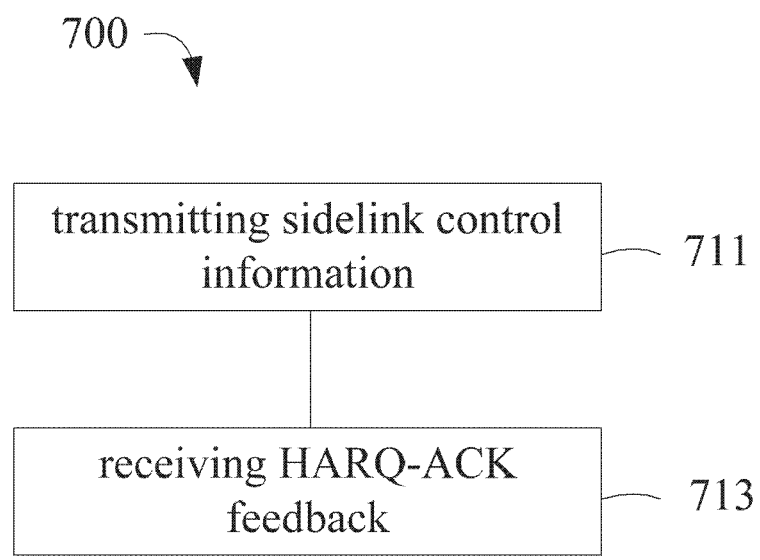
FIG. 7 illustrates a flow chart of a method for wireless communications according to some embodiments of the present disclosure.

FIG. 7 illustrates a flow chart of an exemplary procedure 700 for wireless communications according to some embodiments of the present disclosure.

The exemplary procedure 700 shows a procedure of a UE (e.g., UE 310a in FIG. 3) communicating with another UE (e.g., UE 310b in FIG. 3). Details described in all of the foregoing embodiments of the present disclosure are applicable for the embodiments shown in FIG. 7.

Referring to FIG. 7, in operation 711, a UE (e.g., UE 310a in FIG. 3) may transmit sidelink control information (SCI) on an interlace on a carrier to another UE (e.g., UE 310b in FIG. 3). The SCI may be transmitted in a unicast transmission or a groupcast transmission (option 1 or option 2). The SCI may schedule data transmission (e.g., PSSCH) on the carrier. The interlace on which the SCI is transmitted may include evenly-spaced resource blocks (RBs) in frequency domain. The UE may transmit the data transmission (e.g., PSSCH) to the another UE according to the SCI (not shown in FIG. 7). In operation 713, the UE (e.g., UE 310a in FIG. 3) may receive a HARQ-ACK feedback corresponding to the data transmission on a feedback resource based on the SCI from the another UE (e.g., UE 310b in FIG. 3).

In some embodiments of the present disclosure, the feedback resource may be from a plurality of feedback resources, for example, Z candidate PSFCH resources in the PSFCH resource pool as described above with respect to FIGS. 2-5. In some embodiments of the present disclosure, the SCI may indicate an index of the feedback resource in the plurality of feedback resources. In some embodiments of the present disclosure, the index of the feedback resource in the plurality of feedback resources may be determined according to a method as described above with respect to FIGS. 2-5. For example, the index of the feedback resource may be determined based on the equation $z=M\times i+j$, $z=(M\times i+j+K_1)$ mod $Z$ or $z=(M\times S+K_1+K_2)$ mod $Z$.

In some embodiments of the present disclosure, the UE may further receive a radio resource control (RRC) signaling. The RRC signaling may indicate a plurality of feedback resource sets for accommodating feedback from a plurality of UE groups, as described above with respect to FIGS. 2-5. In these embodiments, the UE may select a feedback resource set from the plurality of feedback resource sets according to a method as described above with respect to FIGS. 2-5. The SCI may indicate an index of a selected feedback resource set of the plurality of feedback resource sets. In some embodiments of the present disclosure, the UE may determine the feedback resource from the indicated feedback resource set, according a method as described above with respect to FIGS. 2-5. For example, The UE may determine the index of the feedback resource in the indicated feedback resource set based on the result of an ID of the UE in the UE group modulo a number of feedback resources in the indicated feedback resource set.

In some embodiments of the present disclosure, a configured or pre-configured resource pool configuration or the SCI may indicate a slot level offset between a slot for data transmission and a slot for a corresponding HARQ-ACK feedback transmission. On this basis, the UE may determine a slot for the HARQ-ACK feedback. The UE may also determine one or more symbols within the slot for the HARQ-ACK feedback.

In these embodiments, in some examples, the SCI transmitted by the UE may further indicate information related to a full interlace or a partial interlace for the HARQ-ACK feedback, as described above with respect to FIGS. 2-5. In some other examples, the full interlace or a partial interlace for the HARQ-ACK feedback may be implicitly determined, as described above with respect to FIGS. 2-5. For example, the index of the interlace for the HARQ-ACK feedback may be the same as the index of the interlace on which the SCI is transmitted or the index of the interlace on which a scheduled PSSCH is transmitted.

In these embodiments, the UE may further decode the received HARQ-ACK feedback using a cyclic shift, an orthogonal cover code (OCC), or both. As described above with respect to FIGS. 2-5, an index of the cyclic shift, or an index of the OCC, or both may be indicated in the SCI, or may be implicitly determined.

It should be appreciated by persons skilled in the art that the sequence of the operations in exemplary procedure 700 may be changed and some of the operations in exemplary procedure 700 may be eliminated or modified, without departing from the spirit and scope of the disclosure.

Figure 8:
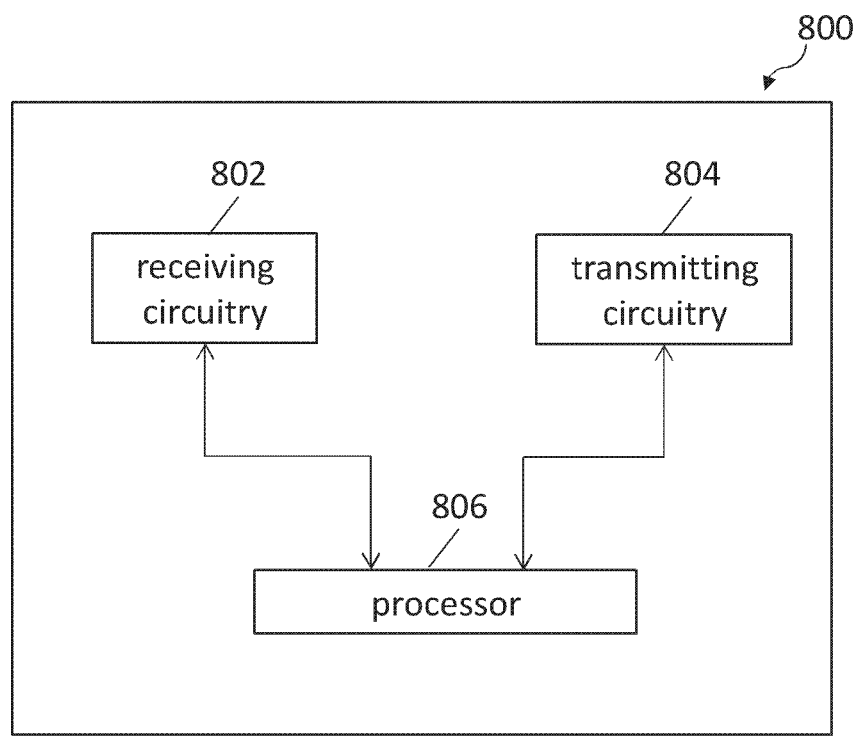
FIG. 8 illustrates a block diagram of an exemplary apparatus in accordance with some embodiments of the present disclosure.

FIG. 8 illustrates an example block diagram of an apparatus 800 according to some embodiments of the present disclosure. Details described in all of the foregoing embodiments of the present disclosure are applicable for the embodiments shown in FIG. 8.

As shown in FIG. 8, the apparatus 800 may include at least one non-transitory computer-readable medium (not illustrated in FIG. 8), at least one receiving circuitry 802, at least one transmitting circuitry 804, and at least one processor 808 coupled to the non-transitory computer-readable medium (not illustrated in FIG. 8), the receiving circuitry 802 and the transmitting circuitry 804. The apparatus 800 may be a UE.

Although in this figure, elements such as the at least one processor 808, transmitting circuitry 804, and receiving circuitry 802 are described in the singular, the plural is contemplated unless limitation to the singular is explicitly stated. In some embodiments of the present disclosure, the receiving circuitry 802 and the transmitting circuitry 804 are combined into a single device, such as a transceiver. In certain embodiments of the present disclosure, the apparatus 800 may further include an input device, a memory, and/or other components.

In some embodiments of the present disclosure, the non-transitory computer-readable medium may have stored thereon computer-executable instructions to cause a processor to implement the operations with respect to the UE as described above. For example, the computer-executable instructions, when executed, cause the processor 808 interacting with receiving circuitry 802 and transmitting circuitry 804, to perform the operations with respect to the UE depicted in FIGS. 1-7.

In some examples, the receiving circuitry 802 may receive sidelink control information (SCI) on an interlace on a carrier. The SCI may schedule data transmission on the carrier. The interlace may include evenly-spaced resource blocks (RBs) in frequency domain. The transmitting circuitry 804 may transmit, corresponding to the data transmission, a HARQ-ACK feedback on a feedback resource based on the SCI. In some embodiments of the present disclosure, the processor 808 may determine the feedback resource according to one of the methods described above with respect to FIGS. 1-7.

In some examples, the transmitting circuitry 804 may transmit sidelink control information (SCI) on an interlace on a carrier. The SCI may schedule data transmission on the carrier. The interlace may include evenly-spaced resource blocks (RBs) in frequency domain. The receiving circuitry 802 may receive corresponding to the data transmission, a HARQ-ACK feedback on a feedback resource based on the SCI. In some embodiments of the present disclosure, the processor 808 may determine the feedback resource according to one of the methods described above with respect to FIGS. 1-7.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including".

What is claimed:

1. A method performed by a first user equipment (UE) for wireless communication, the method comprising:
   receiving, from a second UE, sidelink control information (SCI) on a first interlace on a carrier, wherein the SCI schedules data transmission on one or more interlaces on the carrier and the first interlace comprises evenly-spaced resource blocks (RBs) in a frequency domain; and transmitting, corresponding to the data transmission, a hybrid automatic repeat request acknowledgement (HARQ-ACK) feedback on a feedback resource, wherein the feedback resource is one of multiple feedback resources indicated by the SCI based on the one or more interlaces on the carrier, and wherein a number of the multiple feedback resources is determined based on a number of interlaces dependent on subcarrier spacing of the carrier and a number of cyclic shifts.

2. The method of claim 1, wherein the SCI indicates an index of the feedback resource in the multiple feedback resources.

3. The method of claim 1, further comprising determining an index of the feedback resource in the multiple feedback resources based on one or more of:
   the number of interlaces defined based on the subcarrier spacing of the carrier;
   a slot index of a slot for the data transmission within a slot set, the slot set including slots with corresponding physical sidelink feedback channel (PSFCH) transmissions in a same slot; or
   an interlace index that is based on one or more of an index of the first interlace, or an index of an interlace for the data transmission.

4. The method of claim 1, further comprising:
   receiving a radio resource control (RRC) signaling that indicates a plurality of feedback resource sets for accommodating feedback from a plurality of UE groups.

5. The method of claim 4, wherein the SCI indicates an index of a first feedback resource set of the plurality of feedback resource sets.

6. The method of claim 1, wherein the first UE and the second UE are from a UE group, and the method further comprises:
   determining an index of the feedback resource of the multiple feedback resources based on one or more of:
      a number of slots within a slot set, the slot set including slots with corresponding physical sidelink feedback channel (PSFCH) transmissions in a same slot;
      an identifier (ID) of the first UE in the UE group;
      an ID of the second UE in the UE group; or
      the number of interlaces dependent on the subcarrier spacing of the carrier.

7. The method of claim 1, wherein the SCI indicates at least one of:
   an index of a second interlace, and the feedback resource is transmitted on the second interlace;
   the index of the second interlace and an index of a subband of the carrier, and the feedback resource is transmitted on a partial interlace of the second interlace corresponding to the index of the subband of the carrier;
   an index of the partial interlace, and the feedback resource is transmitted on the partial interlace;
   an index of the subband of the carrier, and the feedback resource is transmitted on the partial interlace of the first interlace corresponding to the index of the subband of the carrier; or
   the index of the subband of the carrier, and the feedback resource is transmitted on the partial interlace of an interlace for the data transmission corresponding to the index of the subband of the carrier.

8. A first user equipment (UE) for wireless communication, comprising:
   at least one memory; and
   at least one processor coupled with the at least one memory and configured to cause the first UE to:
      receive, from a second UE, sidelink control information (SCI) on a first interlace on a carrier, wherein the SCI schedules data transmission on one or more interlaces on the carrier and the first interlace comprises evenly-spaced resource blocks (RBs) in frequency domain; and
      transmit, corresponding to the data transmission, a hybrid automatic repeat request acknowledgement (HARQ-ACK) feedback on a feedback resource, wherein the feedback resource is one of multiple feedback resources indicated by the SCI based on the one or more interlaces on the carrier, and wherein a number of the multiple feedback resources is determined based on a number of interlaces dependent on subcarrier spacing of the carrier and a number of cyclic shifts.

9. The first UE of claim 8, wherein the SCI indicates an index of the feedback resource in the multiple feedback resources.

10. The first UE of claim 8, wherein the at least one processor is configured to cause the first UE to determine an index of the feedback resource in the multiple feedback resources based on one or more of:
    the number of interlaces dependent on the subcarrier spacing of the carrier;
    a slot index of a slot for the data transmission within a slot set, the slot set including slots with corresponding physical sidelink feedback channel (PSFCH) transmissions in a same slot; or
    an interlace index that is based on one or more of an index of the first interlace, or an index of an interlace for the data transmission.

11. The first UE of claim 8, wherein the at least one processor is configured to cause the first UE to receive a radio resource control (RRC) signaling that indicates a plurality of feedback resource sets for accommodating feedback from a plurality of UE groups.

12. The first UE of claim 11, wherein the SCI indicates an index of a first feedback resource set of the plurality of feedback resource sets.

13. The first UE of claim 8, wherein the first UE and the second UE are from a UE group, and wherein the at least one processor is configured to cause the first UE to:
    determining an index of the feedback resource of multiple feedback resources based on one or more of:
       a number of slots within a slot set, the slot set including slots with corresponding physical sidelink feedback channel (PSFCH) transmissions in a same slot;
       an identifier (ID) of the first UE in the UE group;
       an ID of the second UE in the UE group; or
       the number of interlaces dependent on the subcarrier spacing of the carrier.

14. The first UE of claim 8, wherein the SCI indicates at least one of:
    an index of a second interlace, and the feedback resource is transmitted on the second interlace;
    the index of the second interlace and an index of a subband of the carrier, and the feedback resource is transmitted on a partial interlace of the second interlace corresponding to the index of the subband of the carrier;
    an index of the partial interlace, and the feedback resource is transmitted on the partial interlace;

an index of the subband of the carrier, and the feedback resource is transmitted on the partial interlace of the first interlace corresponding to the index of the subband of the carrier; or the index of the subband of the carrier, and the feedback resource is transmitted on the partial interlace of an interlace for the data transmission corresponding to the index of the subband of the carrier.

15. A first user equipment (UE) for wireless communication, comprising:
at least one memory; and
at least one processor coupled with the at least one memory and configured to cause the first UE to:
transmit, to a second UE, sidelink control information (SCI) on a first interlace on a carrier, wherein the SCI schedules data transmission on one or more interlaces on the carrier and the first interlace comprises evenly-spaced resource blocks (RBs) in a frequency domain; and
receive, corresponding to the data transmission, a hybrid automatic repeat request acknowledgement (HARQ-ACK) feedback on a feedback resource, wherein the feedback resource is one of multiple feedback resources indicated by the SCI based on the one or more interlaces on the carrier, and wherein a number of the multiple feedback resources is determined based on a number of interlaces dependent on subcarrier spacing of the carrier and a number of cyclic shifts.

16. The first UE of claim 15, wherein an index of the feedback resource is based on at least one or more of:
the number of interlaces dependent on the subcarrier spacing of the carrier;
a slot index of a slot for the data transmission within a slot set, the slot set including slots with corresponding physical sidelink feedback channel (PSFCH) transmissions in a same slot; or
an interlace index that is based on one or more of the index of the first interlace, or an index of an interlace for the data transmission.

17. The first UE of claim 15, wherein the first UE and an additional UE are from a UE group, and the at least one processor is configured to cause the first UE to determine an index of the feedback resource based on at least one or more of:

a number of slots within a slot set that includes slots with corresponding physical sidelink feedback channel (PSFCH) transmissions in a same slot;
an identifier (ID) of the first UE in the UE group;
an ID of the additional UE in the UE group; or
the number of interlaces dependent on the subcarrier spacing of the carrier.

18. The first UE of claim 15, wherein the HARQ-ACK feedback is received in one or more symbols within a slot, and the at least one processor is configured to cause the first UE to decode the HARQ-ACK feedback using at least one of a cyclic shift or an orthogonal cover code (OCC), wherein at least one of an index of the cyclic shift, or an index of the OCC indicated in the SCI; or
at least one of the index of the cyclic shift and the index of the OCC is determined based on one or more of: an index of the slot within a radio frame, an index of the one or more symbols within the slot, or an index of the one or more symbols with respect to the first symbol of the one or more symbols in a time domain.

19. A processor for wireless communication, comprising:
at least one controller coupled with at least one memory and configured to cause the processor to:
receive, from a user equipment (UE), sidelink control information (SCI) on a first interlace on a carrier, wherein the SCI schedules data transmission on one or more interlaces on the carrier and the first interlace comprises evenly-spaced resource blocks (RBs) in frequency domain; and
transmit, corresponding to the data transmission, a hybrid automatic repeat request acknowledgement (HARQ-ACK) feedback on a feedback resource, wherein the feedback resource is one of multiple feedback resources indicated by the SCI based on the one or more interlaces on the carrier, and wherein a number of the multiple feedback resources is determined based on a number of interlaces dependent on subcarrier spacing of the carrier and a number of cyclic shifts.

20. The processor of claim 19, wherein the SCI indicates an index of the feedback resource in the multiple feedback resources.

* * * * *